Figure 1:
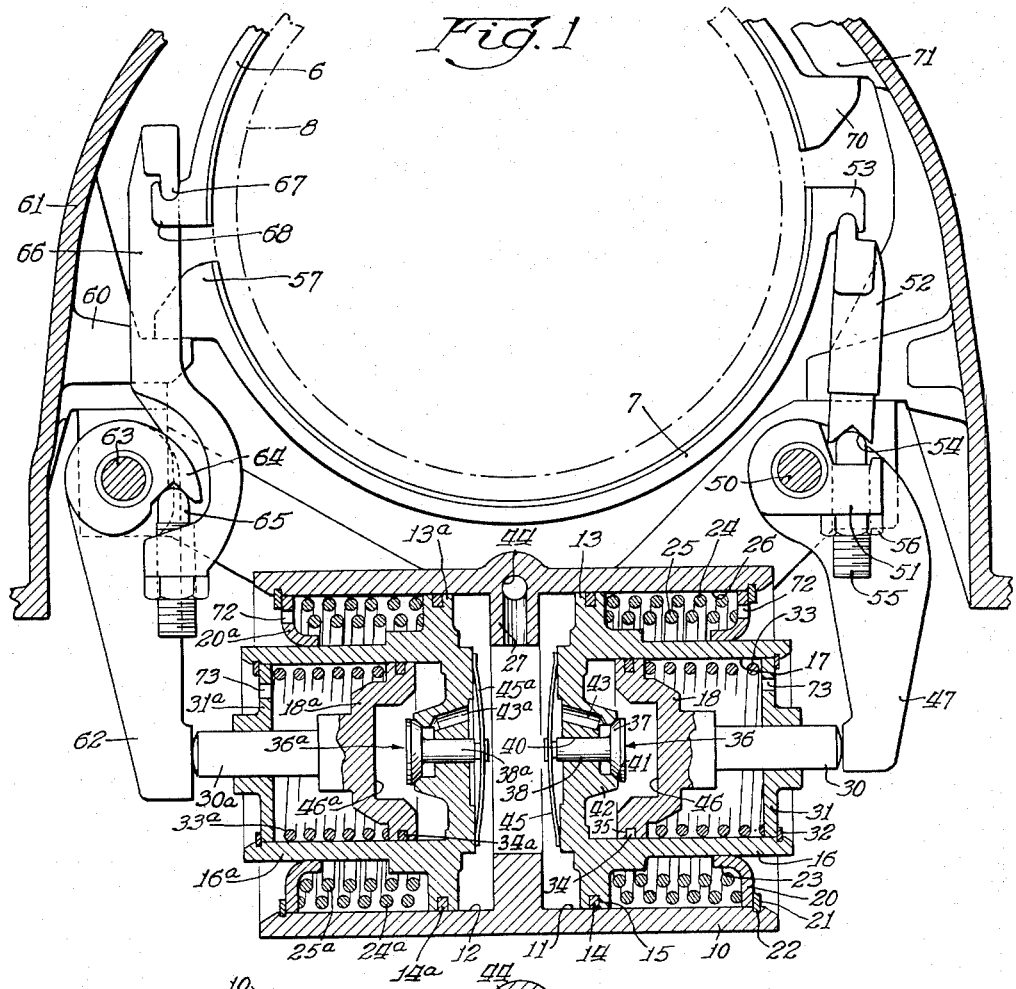

Inventor:
Sidney V. Hettinger, Jr.

Patented May 19, 1953

2,638,750

UNITED STATES PATENT OFFICE 2,638,750

TRANSMISSION BRAKE SERVOMOTOR

Sidney V. Hettinger, Jr., Westchester, Ill., assignor to Borg-Warner Corporation, Chicago, Ill., a corporation of Illinois Application March 24, 1950, Serial No. 151,793

2 Claims. (Cl. 60—97)

This invention relates to a transmission brake, and more particularly to a servomotor for a transmission brake.

In automotive transmissions of the type employing planetary gear sets, it has become the general practice to employ a drum type brake to hold an element of the planetary gear stationary to serve as a reaction member. In such automatic transmissions, application of the brake or brakes is under the control of valves which operate automatically in response to changes in vehicle speed and torque load, as reflected by the governor and by depression of the accelerator pedal. In use, the brake friction surfaces wear and it has been found that it is difficult to provide smooth engagement of the brakes after substantial wear without resorting to unduly complicated valving mechanisms. Thus, as shown in the co-pending application of H. G. English, Serial No. 149,049 filed March 11, 1950, an improved transmission brake actuating system may be provided including means for taking up the slack resulting from wear prior to application of engaging pressure to the brake bands. This desirable result is achieved by employing two pistons, the smaller one of which moves in advance of the other to take up the slack and thereafter, by means of a hydraulic locking arrangement, is caused to move in unison with the second and larger piston to apply braking force to the brake bands. The present invention is directed to this type of improved servo mechanism.

An object of the present invention is to provide a new and improved transmission brake servomotor, and more particularly an improved hydraulic locking mechanism for a servomotor.

A further object of the present invention is to provide a new and improved dual servomotor system for actuating a pair of brake bands associated with a drum or shaft simultaneously and with equal force.

In accordance with one embodiment of this invention, a transmission brake servomotor may comprise a pair of pistons of unequal effective areas arranged coaxially and provided with hydraulic locking means for permitting the smaller area piston to move in advance of the larger area piston to take up slack and for thereafter closing to cause the two pistons to move in unison in response to further application of hydraulic pressure. More particularly, the hydraulic locking mechanism comprises a poppet valve arranged to be normally unseated when the pistons are in the rest position to permit application of fluid pressure to the smaller piston. Upon movement of the smaller piston to take up slack followed by movement of the larger piston as the pressure in the piston chambers increases the poppet valve seats, trapping fluid pressure in the piston chamber associated with the smaller piston and preventing relative movement thereafter between the two pistons.

Figure 2:
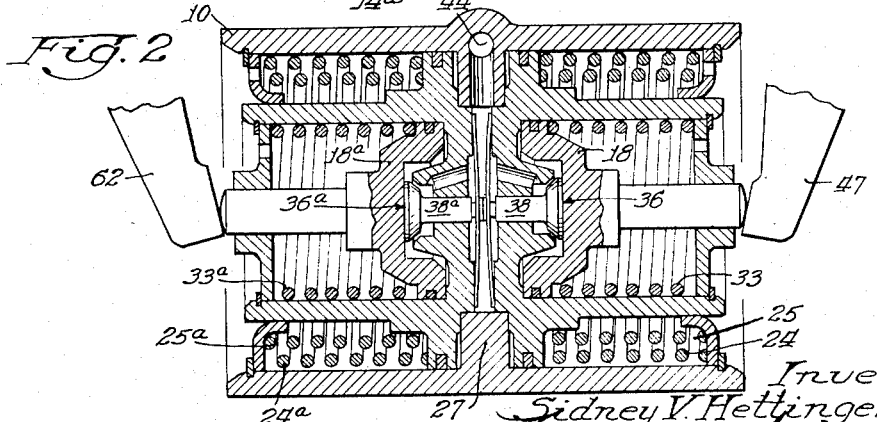

Other objects and advantages of the present invention will be apparent from the following detailed description taken in conjunction with the drawing, wherein:

Fig. 1 is a transverse, sectional view of a transmission brake dual servomotor constructed in accordance with one embodiment of this invention showing the position of the pistons during application of engaging pressure to the bands; and Fig. 2 is a detail view of the servomotor showing the position of the pistons prior to application of pressure to either of the pistons.

While this invention will be described primarily in conjunction with a dual type servomotor similar in function and arrangement to that particularly shown in the aforementioned H. G. English application, it will be understood that the invention is equally applicable to a single servo system.

Referring first to Fig. 1 wherein a dual type servomotor for controlling a pair of oppositely disposed brake bands 6 and 7 is illustrated, it will be seen that the bands are engageable with the outer periphery of a brake drum designated generally at 8. The drum 8 may be fixed to a suitable shaft (not shown) the rotation of which is controlled through the brake mechanism. As the brake bands wear due to use, either they must be readjusted or some provision made for taking up the slack prior to engagement of the bands in braking relation. The servomotor of the present invention avoids the difficulties and expense involved in making periodic adjustments by providing automatic means for taking up slack. This is particularly important in automatic transmissions where the brakes are energized automatically; here wear throws off the critical relations and may result in too sudden or delayed engagement of the bands, thereby producing jerky operation of the transmission.

Referring now to the dual servomotor mechanism of this invention, it will be seen that the mechanism is enclosed in a housing 10 which may be of generally cylindrical configuration and has formed therein on the right side, as viewed in these figures, a first servomotor chamber 11 and on the left side a second servomotor chamber 12. As both servomotors are substantially identical, only the right servomotor will be described in detail, the description of the right motor being equally applicable to the left.

The right servomotor comprises a large diameter first or main piston 13, the outer periphery of which is journalled in the right chamber 11. Packing 14 disposed in an annular groove 15 formed about the periphery of the head of piston 13 provides a suitable seal. Extending from the right side of the piston 13 is a sleeve or tubular portion 16, preferably integrally formed with the piston head and disposed coaxially of the piston chamber 11. The sleeve 16 defines at its inner wall a second chamber 17 in which is slidably journalled a second or slack take-up piston 18. Piston 18 is movable relatively to piston 13 and means are provided in accordance with this invention to permit initial movement of the piston 18 in advance of piston 13 to provide the aforementioned slack take-up. Thereafter, further relative movement of the pistons is prevented, and the pistons move forward in unison to cause engagement of the associated brake band.

The rearwardly extending portion 16 of piston 13 is journalled at its right end portion in an annular retaining plate 20 which is held within the right end of chamber 11 by a suitable retaining ring 21 carried in a groove 22 formed in the inner periphery of the right end of chamber 11. The inner edge of retainer member 20 is bent inwardly, that is, to the left as indicated at 23, to provide a suitable journal or bearing surface for the outer periphery of tubular portion 16 of piston 13.

The annular plate 20 also serves as a retainer or stop for the right ends of a pair of heavy springs 24 and 25 disposed in the annular chamber 26 provided between the outer periphery of tubular portion 16 and the inside wall of the housing 10. The left ends of springs 24 and 25 bear against the right side of the outer portion of piston 13 and, thus, urge piston 13 to the left against a stop provided by an inwardly extending ridge 27 formed about the interior of the mid portion of housing 10. In some cases, a single heavy spring may be employed instead of the two springs 24 and 25, the two springs being used because this arrangement facilitates obtaining the desired resiliency characteristics.

The piston 18 has extending from the right side thereof a piston shaft 30 which may be integrally formed therewith and the rightwardly extending portion of shaft 30 is slidably supported by a second annular member 31 carried by the right end of tubular portion 16 of piston 13. The annular member 31 is retained in position by a split ring 32 mounted on the right end of tubular portion 16 in conventional manner. The inner edge of retainer member 31 is flanged outwardly, that is, bent to the right, to provide a suitable bearing surface for the piston shaft 30. In order to urge the piston 18 to the left to the rest position, a third spring 33 is provided, the right end of spring 33 bearing against the left side of retainer member 31 and the left end of spring 33 bearing against the right side of the outer portion of piston 18. Packing 34 carried in a groove 35 formed in the outer periphery of piston 18 serves to provide a suitable seal between the piston and the wall of chamber 17.

It will be understood that there being two springs 24 and 25 associated with the larger piston 13 and only one spring 33 associated with the smaller piston 18, application of fluid pressure to the left surfaces of these pistons will cause piston 18 to move in advance of piston 13. The primary function of these springs is to provide this initial movement of piston 18 in advance of piston 13, but an equally important function is to assure rapid return of both pistons to the rest position upon release of fluid pressure.

In order to prevent relative movement of the piston 18 with respect to the piston 13 after the desired slack take-up has occurred, there is provided a poppet valve designated 36 which, when open, permits fluid to reach the smaller piston 18 but which, when seated, prevents return of fluid from the piston 18, thereby in effect hydraulically locking piston 18 to piston 13. More particularly, the poppet valve 36 comprises a head portion 37 of disc-like configuration and a stem 38 journalled in an aperture 40 formed through the center of the head of piston 13 and preferably disposed coaxially thereof. It will be evident that when pressure is applied to the right side of the head of poppet valve 36, the valve will tend to seat.

Valve 36 when closed seats on an annular seat 41 formed at the beveled inner edge of an annular ridge or shoulder 42, integrally formed with the right side of the head of piston 13 and disposed coaxially of aperture 40. A short passage 43 is formed through the head of piston 13 and extends from the left to the right side thereof, the right end of the passage 43 terminating at a point intermediate the base of shoulder 42 and the right end of aperture 40. When pressure is supplied to the servomotor, pressure is communicated to the under side of poppet valve 36 through this passage 43. In the operation of this servo mechanism, fluid pressure may be admitted to the housing 10 through a port 44, located in the mid portion of the housing and arranged to communicate pressure simultaneously to both the right and the left servomotors.

The poppet valve 36 is normally urged to closed position by a flat spring 45 which is fixed at its mid portion to the left end of valve stem 38 and the end portions of which are bent to the right so as to bear against the outer portions of the left side of piston 13, thus tending to move valve 36 to the left to closed position. Spring 45–a associated with valve stem 38–a of the left servomotor poppet valve 36–a, of course, has its outer ends bent to the left so as to tend to move valve 36–a to the right to closed position. The left end of valve stem 38 may be made somewhat smaller than a suitable aperture formed through the flat spring 45 to permit inserting the end of the valve stem in the flat spring aperture and then the terminal end of the valve stem is swaged over the left side of the spring to hold it securely in position on the valve stem.

When the servomotors are not energized, but are in the rest position as shown in Fig. 2, then the inner ends, that is, the opposed ends of the valve stems 38 and 38–a of the two poppet valves 36 and 36–a respectively of the two servomotors abut. The thickness of annular ridge 27 formed about the mid portion of housing 10 and the configuration of the opposed sides of the two main pistons 13 and 13–a are selected with reference to the length of the two poppet valve stems so that in the rest position the ends of the stems will abut sufficiently to cause both poppet valves to be unseated. The relatively slight spring pressure provided by the flat springs 45 and 45–a is readily overcome by the larger springs 24, 25 and 33 and 24–a, 25–a and 33–a so that the springs 45 and 45–a are not a factor in preventing unseating of the poppet valves.

Thus, at the moment fluid pressure is first applied to the servomotors through the port 44, the short passages 43 and 43-a formed through the pistons 13 and 13-a are effective to communicate pressure to the inner or slack take-up pistons 18 and 18-a. As explained hereinbefore, because of the use of the heavier springs 24 and 25, and 24-a and 25-a, as compared with the selected strength of springs 33 and 33-a the slack take-up pistons 18 and 18-a will move outwardly in advance of the pistons 13 and 13-a. This initial advance movement of the inner pistons 18 and 18-a is effective to take up the slack, that is, to cause initial engagement of the brake bands 6 and 7 with the drum 8. As the pistons 18 and 18-a move outwardly, they will, of course, encounter resistance increasing sharply as the engagement of the bands with the drum begins. This resistance supplements the spring resistance provided by the springs 33 and 33-a in retarding further advance of the slack take-up pistons and at the same time increasing fluid pressure in the mid portion of the housing 10 becomes effective to overcome the resistance of springs 24 and 25 and 24-a and 25-a and to move the primary pistons 13 and 13-a outwardly. As soon as the primary pistons have moved outwardly, that is, in opposite directions, a sufficient distance to permit the poppet valves 36 and 36-a to seat, it will be evident that fluid will be trapped within the chamber 46 defined by the left side of piston 18, the right side of piston 13 and the inner wall of sleeve portion 16, and at substantially the same time within the chamber 46-a defined by the right side of piston 18-a, the left side of piston 13-a and the inner wall of sleeve portion 16-a. This trapping of fluid pressure hydraulically locks the pistons 18 and 18-a to the pistons 13 and 13-a respectively and continued application of pressure to the pistons 13 and 13-a will, therefore, cause the two pistons to move forward in unison, applying engaging pressure to the associated brake bands.

Brake engaging force is applied to the lower brake band 7 from the right piston shaft 30 through a lever arm 47, the lower end of which is engaged by the right end of piston shaft 30. Lever arm 47 is pivotally supported adjacent its upper end on a stub shaft or post 50 and has affixed thereto a short crank arm 51 which, when the lever arm 47 is moved in a counterclockwise direction, also moves in a counterclockwise direction to urge upwardly a strut 52 bearing at its upper end against a lug 53, integrally formed with the right end of brake band 7. The lower end of strut 52 is provided with a recess or notch 54 in which is received the rounded upper end of a threaded member 55 carried by the short crank arm 51. By suitably threading the member 55 in the arm 51 the degree of engagement of the brake band may be closely adjusted. A lock nut 56 is provided for holding the adjusted position. The left end of brake band 7 is provided with an anchor lug 57 which may be suitably secured thereto or integrally formed therewith and the anchor lug bears against a projection 60 which may be integrally formed with the brake housing 61. Thus, movement of the strut 52 upwardly with the left end of the brake band 7 held stationary by the anchor 57 will cause the brake band to wrap around the lower portion of drum 8.

Engagement of the upper brake band 6 is effected in a generally similar manner by movement of the left piston shaft 30-a to the left, the left end of piston shaft 30-a bearing against the lower portion of a lever arm 62, the upper portion of which is pivotally supported on a stub shaft 63 carried by the brake housing. Clockwise movement of the lever arm 62 causes a short crank arm 64, projecting to the right, to engage at its under side the upper end of a screw member 65, similar to the member 55. Screw 65 is threaded in the lower end of a strut 66, the upper end of which is connected to the left end of upper brake band 6 by a downwardly depending lug 67, which engages at its lower end a lug 68 integrally formed with the left end of brake band 6. The right end of brake band 6 is provided with an anchor lug 70 which bears against a projecting member 71 secured to the right inner side of the housing wall of the brake arrangement. Thus, clockwise movement of the lever arm 62, pulling the strut 66 downwardly, will cause the upper brake band 6 to be wrapped around the drum 8. The brake linkage arrangement shown and described here is generally similar to that shown in the above referenced application of H. G. English.

In the event that there is some leakage of fluid pressure, either through the poppet valves or past the packing 34 or 34-a or past the packing 14 or 14-a, it will be apparent that each primary piston 13 or 13-a, so long as it is subjected to fluid pressure, will move outwardly to make up for the fluid lost and, thus, maintain the desired engaging pressure on the brake bands.

In order to permit free movement of the pistons with respect to the retaining plates 20 and 31 of the right motor and 20-a and 31-a of the left motor, each of the plates of each motor is provided with one or more small porting apertures 72 and 73 respectively to prevent trapping of fluid between the pistons and these plates.

Upon release of fluid pressure, that is, for example, upon connecting port 44 to the sump or discharge line of the system, the springs 24, 25 and 33 and 24-a, 25-a and 33-a, aided by the tendency of the brake bands themselves to release, will cause a rapid return of the pistons to the rest position. The outer or main pistons, being subjected to greater force by virtue of the two springs associated with each of these pistons, as compared with the one spring associated with each of the slack take-up pistons, will tend to move to the rest position in advance of the slack take-up pistons, thus causing unseating of the poppet valves 36 and 36-a and permitting exhaust of the fluid trapped between the pistons 18 and 18-a and the pistons 13 and 13-a respectively as the pistons 18 and 18-a are moved inwardly by the springs 33 and 33-a.

While this invention has been described in connection with a dual servomotor system, a single motor may be provided employing the principles of this invention by merely omitting either the right or the left servomotor and providing a stop on the brake motor housing end wall engageable by the end of the poppet valve stem so that in the rest position the poppet valve will be unseated.

Where herein the various parts of this invention have been referred to as being located in a right or a left position, it will be understood that this is done solely for the purpose of facilitating description and that such references relate only to the relative positions of the parts as shown in the accompanying drawing.

While but one embodiment of this invention has been shown and described, it will be understood that many changes and modifications may be made therein without departing from the spirit or scope of the present invention.

What is claimed is:

1. A servomotor for a brake actuating mechanism comprising a housing, a piston slidably journalled in said housing and shiftable relatively thereto, means including said housing and one side of said piston defining a first pressure chamber, a sleeve portion extending from the opposite side of said piston coaxially of said housing and having a substantially lesser diameter than said housing, a second piston journalled within said sleeve and capable of relative axial movement with respect thereto and with respect to said first piston member, a second piston chamber being defined by said opposite side of said first piston, the adjacent side of said second piston and the inner wall of said sleeve portion, means for supplying fluid pressure to said housing and to said first chamber, said first piston having a passage formed therethrough for communicating pressure from said first chamber to said second chamber, a poppet valve slidably journalled in said first piston effective when seated to close said passage, said poppet valve having a stem portion extending out of said first piston, and a sheet metal spring having an edge portion resiliently abutting said first piston and a central portion secured to said poppet valve stem portion for urging said poppet valve to seated position.

2. A servomotor including a housing, a pair of pistons slidably journalled in said housing and shiftable relatively thereto, means including said housing and one side of each of said pistons defining a first pressure chamber, a sleeve portion on each of said pistons and respectively extending from the opposite sides of said pistons coaxially of said housing and each of the sleeve portions having a substantially lesser diameter than said housing, a second pair of pistons respectively journalled within said sleeve portions and capable of relative axial movement with respect thereto, a pair of pressure chambers defined by said opposite sides of said first pair of pistons, the adjacent side of each of said second pair of pistons and the inner walls of said sleeve portions, means for supplying fluid pressure to said housing and to said first chamber, said first pair of pistons each having a passage formed therethrough for communicating pressure from the first chamber to each of said other chambers, poppet valves slidably journalled in each of said first pair of pistons and effective when seated to respectively close said passages, said poppet valves each having a stem portion respectively extending out of said first pair of pistons, and a pair of sheet metal springs each having an edge portion resiliently abutting said first pair of pistons respectively and a control portion respectively secured to the poppet valve stem portions for urging said poppet valves to seated positions.

SIDNEY V. HETTINGER, Jr.

References Cited in the file of this patent

UNITED STATES PATENTS

| Number | Name | Date |
|---|---|---|
| 1,865,105 | Houplain | June 28, 1932 |
| 2,170,851 | Carroll | Aug. 29, 1939 |
| 2,343,698 | Parnell | Mar. 7, 1944 |

FOREIGN PATENTS

| Number | Country | Date |
|---|---|---|
| 521,980 | Great Britain | June 5, 1940 |